US010013656B1

(12) United States Patent
Ciarlini et al.

(10) Patent No.: US 10,013,656 B1
(45) Date of Patent: Jul. 3, 2018

(54) METHODS AND APPARATUS FOR ANALYTICAL PROCESSING OF PROVENANCE DATA FOR HPC WORKFLOW OPTIMIZATION

(71) Applicant: EMC IP Holding Company LLC, Hopkinton, MA (US)

(72) Inventors: Angelo E. M. Ciarlini, Rio de Janeiro (BR); Jonas F. Dias, Rio de Janeiro (BR); Percy E. Rivera Salas, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 565 days.

(21) Appl. No.: 14/580,732

(22) Filed: Dec. 23, 2014

(51) Int. Cl.
*G06F 17/00* (2006.01)
*G06N 5/04* (2006.01)

(52) U.S. Cl.
CPC ...................... *G06N 5/04* (2013.01)

(58) Field of Classification Search
USPC ..................................... 706/46, 12
See application file for complete search history.

(56) References Cited

U.S. PATENT DOCUMENTS

| | | | | |
|---|---|---|---|---|
| 9,336,494 B1* | 5/2016 | Purpura | ............... | G06N 99/005 |
| 2003/0176931 A1* | 9/2003 | Pednault | ........... | G06F 17/30539 |
| | | | | 700/31 |
| 2011/0071956 A1* | 3/2011 | Pinto | ...................... | G06F 17/50 |
| | | | | 705/348 |
| 2012/0054134 A1* | 3/2012 | West | ....................... | G06N 5/04 |
| | | | | 706/13 |
| 2012/0317060 A1* | 12/2012 | Jebara | .................. | G06N 99/005 |
| | | | | 706/21 |
| 2014/0279741 A1* | 9/2014 | Sow | ..................... | G06N 99/005 |
| | | | | 706/12 |

OTHER PUBLICATIONS

Santos ID, Dias J, Oliveira DD, Ogasawara E, Ocaña K, Mattoso M. "Runtime dynamic structural changes of scientific workflows in clouds". In Proceedings of the 2013 IEEE/ACM 6th International Conference on Utility and Cloud Computing Dec. 9, 2013 (pp. 417-422). IEEE Computer Society.*

(Continued)

*Primary Examiner* — David R Vincent
(74) *Attorney, Agent, or Firm* — Ryan, Mason & Lewis, LLP

(57) ABSTRACT

Methods and apparatus are provided for analytical processing of provenance data for High Performance Computing workflow optimization. Prediction models for a workflow composed of a plurality of activities are created by (i) generating a plurality of prediction functions from input features and output features of the workflow, wherein each of the prediction functions predicts at least one output feature of at least one of activities of the workflow based on the input features of at least one activity; and (ii) combining the plurality of prediction functions to generate the prediction models, wherein each of the prediction models predicts a final output feature of the workflow based on an input of the workflow for a given execution plan of the workflow. A plurality of the prediction models can be evaluated to select, among the possible execution plans, an instantiation of the workflow for a given input that optimizes a given user goal.

23 Claims, 6 Drawing Sheets

(56) References Cited

OTHER PUBLICATIONS

Publication info for "Runtime Dynamic Structural Changes of Scientific Workflows in Clouds" (Dos Santos et al, Dec. 9, 2013) showing date of 2013 IEEE/ACM 6th International Conference on Utility and Cloud Computing, Dec. 9-12, 2013.*
Costa, F., Silva, V., De Oliveira, D., Ocaña, K., Ogasawara, E., Dias, J., & Mattoso, M. (Mar. 2013). "Capturing and querying workflow runtime provenance with PROV: a practical approach". In Proceedings of the Joint EDBT/ICDT 2013 Workshop.*
De Oliveira D, Ogasawara E, Baião F, Mattoso M. "Scicumulus: A lightweight cloud middleware to explore many task computing paradigm in scientific workflows". In Cloud Computing (CLOUD), 2010 IEEE 3rd International Conference on Jul. 5, 2010 (pp. 378-385). IEEE.*
Dias J, Ogasawara E, De Oliveira D, Porto F, Valduriez P, Mattoso M. "Algebraic dataflows for big data analysis". In Big Data, 2013 IEEE International Conference on Oct. 6, 2013 (pp. 150-155). IEEE.*
Wang L, Duan R, Li X, Lu S, Hung T, Calheiros RN, Buyya R. "An iterative optimization framework for adaptive workflow management in computational clouds". In Trust, Security and Privacy in Computing and Communications (TrustCom), 2013 12th IEEE International Conference on Jul. 16, 2013 (pp. 1049-1056). IEEE.*
Ogasawara, E., Dias, J., Silva, V., Chirigati, F., Oliveira, D., Porto, F., Valduriez, P. and Mattoso, M., 2013. "Chiron: a parallel engine for algebraic scientific workflows". Concurrency and Computation: Practice and Experience, 25(16), pp. 2327-2341. Published online May 10, 2013 in Wiley Online Library (wileyonlinelibrary.com).*
Costa F, de Oliveira D, Ocaña KA, Ogasawara E, Mattoso M. "Enabling re-executions of parallel scientific workflows using runtime provenance data". In International Provenance and Annotation Workshop Jun. 19, 2012 (pp. 229-232). Springer Berlin Heidelberg.*
Monge DA, Holec M, Železný F, Garino CG. "Ensemble learning of run-time prediction models for data-intensive scientific workflows". In Latin American High Performance Computing Conference Oct. 20, 2014 (pp. 83-97). Springer Berlin Heidelberg.*
Miu T, Missier P. "Predicting the execution time of workflow activities based on their input features". In High Performance Computing, Networking, Storage and Analysis (SCC), 2012 SC Companion: Nov. 10, 2012 (pp. 64-72). IEEE.*
Dai D, Chen Y, Kimpe D, Ross R. "Provenance-based object storage prediction scheme for scientific big data applications". In Big Data (Big Data), 2014 IEEE International Conference on Oct. 27, 2014 (pp. 271-280). IEEE.*
Dias J, Ogasawara E, de Oliveira D, Porto F, Coutinho AL, Mattoso M. "Supporting dynamic parameter sweep in adaptive and user-steered workflow". In Proceedings of the 6th workshop on Workflows in support of large-scale science Nov. 14, 2011 (pp. 31-36). ACM.*
Guerra G, Rochinha FA, Elias R, De Oliveira D, Ogasawara E, Dias JF, Mattoso M, Coutinho AL. "Uncertainty quantification in computational predictive models for fluid dynamics using a workflow management engine". International Journal for Uncertainty Quantification. 2012;2(1): 53-71.*
Mattoso M, Ocaña K, Horta F, Dias J, Ogasawara E, Silva V, de Oliveira D, Costa F, Araújo I. "User-steering of HPC workflows: state-of-the-art and future directions". In Proceedings of the 2nd ACM SIGMOD Workshop on Scalable Workflow Execution Engines and Technologies Jun. 23, 2013 (p. 4). ACM.*
Bellotti et al., Activity-Based Serendipitous Recommendations with the Magitti Mobile Leisure Guide, 2008, CHI 2008 Proceedings, pp. 1-10.*
Fourer et al., "Extendng an Algebraic Modeling Language to Support Constraint Programming", INFORMS Journal on Computing, (2002).
Freire et al., "Provenance for Computational Tasks: A Survey", University of Utah, Computing in Science & Engineering, pp. 20-30, IEEE, 2008.
JSH Kornbluth, "A Survey of Goal Programming," OMEGA, The Int. Jl of Mgmt Sci., vol. 1, No. 2, (1973).
Marler et al., "Survey of multi-objective optimization methods for engineering", Struct Multidisc Optim 26, pp. 369-395 (2004).
Osagawara et al., "An Algebraic Approach for Data-Centric Scientific Workflows", The 37th Int'l Conf. on Very Large Data Bases, Proceedings of the VLDB Endowment, vol. 4, No. 12, (2011).
Olston et al., "Pig Latin: A Not-So-Foreign Language for Data Processing", SIGMOD '08, Vancouver, BC, (2008).

* cited by examiner

METHODS AND APPARATUS FOR ANALYTICAL PROCESSING OF PROVENANCE DATA FOR HPC WORKFLOW OPTIMIZATION

FIELD

The field relates generally to analysis of provenance data in a workflow environment.

BACKGROUND

Many scientific and engineering experiments explore different computer applications and settings. These different applications are chained as the data produced by one application is consumed by subsequent ones. Large volumes of data of different types can be explored throughout this chain of applications. This process demands certain levels of control in order to guarantee the reliability and reproducibility of the experiment. This experimental process is often supported by scientific workflows on High Performance Computing (HPC) environments. Due to this fact, these workflows are typically referred to as HPC workflows. Scientists and engineers can manage the execution of their applications, their data-flow and provenance data by using HPC workflow management systems.

Within these workflows, various tasks are executed and combined. As there are usually various alternative applications for each task, a single workflow can have many different execution plans. There are many variables involved in the design and execution of workflows. Thus, there are also many opportunities for optimization, targeting different goals, such as execution time, resource utilization and accuracy, among others.

In order to provide reliability and reproducibility, it is necessary to save workflow provenance data. Provenance data can provide a rich source of information about the behavior of the workflow under different circumstances. In addition, provenance data can also be instrumental to optimize the workflow for different scenarios and goals.

Over time, HPC workflows have many executions and their provenance database grows very quickly in size. The velocity of data ingestion is very high because many workflows can be executed simultaneously and every task of the workflow typically stores provenance data continuously. The provenance data must be analyzed efficiently, in particular when there is a need to optimize the workflow at run-time. The variety of data is also an issue because there are usually several types of data that are accessed within a scientific domain.

A need exists for improved techniques for analytical processing of provenance data for optimization of HPC workflow execution. A further need exists for improved techniques for capturing large amounts of provenance data efficiently and quickly in a distributed environment, without compromising the overall performance of the workflow execution.

SUMMARY

Illustrative embodiments of the present invention provide methods and apparatus for analytical processing of provenance data for HPC workflow optimization. In one exemplary embodiment, one or more prediction models for a workflow composed of a plurality of activities are created by generating a plurality of prediction functions from one or more input features and one or more output features of the workflow, wherein each of the prediction functions predicts at least one of the output features of at least one of the plurality of activities of the workflow based on one or more of the input features of the at least one activity of the workflow; and combining the plurality of prediction functions to generate the one or more prediction models, wherein each of the one or more prediction models predicts a final output feature of the workflow based on an input of the workflow. Generally, each of the prediction models predicts a final output feature of the workflow for a given execution plan of the workflow. A plurality of the prediction models can be evaluated to select an instantiation of the workflow for a given input and a given user goal.

In at least one embodiment, the input features and the output features are extracted from one or more of input data, output data, execution data and provenance data of the workflow. In at least one embodiment, at least some of the input features and the output features comprise features from within one or more files referenced by the provenance data.

In one exemplary embodiment, the output features of a given activity are propagated through the workflow as one or more input features of one or more activities following the given activity of the workflow.

In another exemplary embodiment, the steps of generating a plurality of prediction functions and combining the plurality of prediction functions are optionally repeated to regenerate the one or more prediction models based on new provenance data.

Advantageously, illustrative embodiments of the invention provide improved techniques for analytical processing of provenance data for HPC workflow optimization. These and other features and advantages of the present invention will become more readily apparent from the accompanying drawings and the following detailed description.

DETAILED DESCRIPTION

Figure 1:
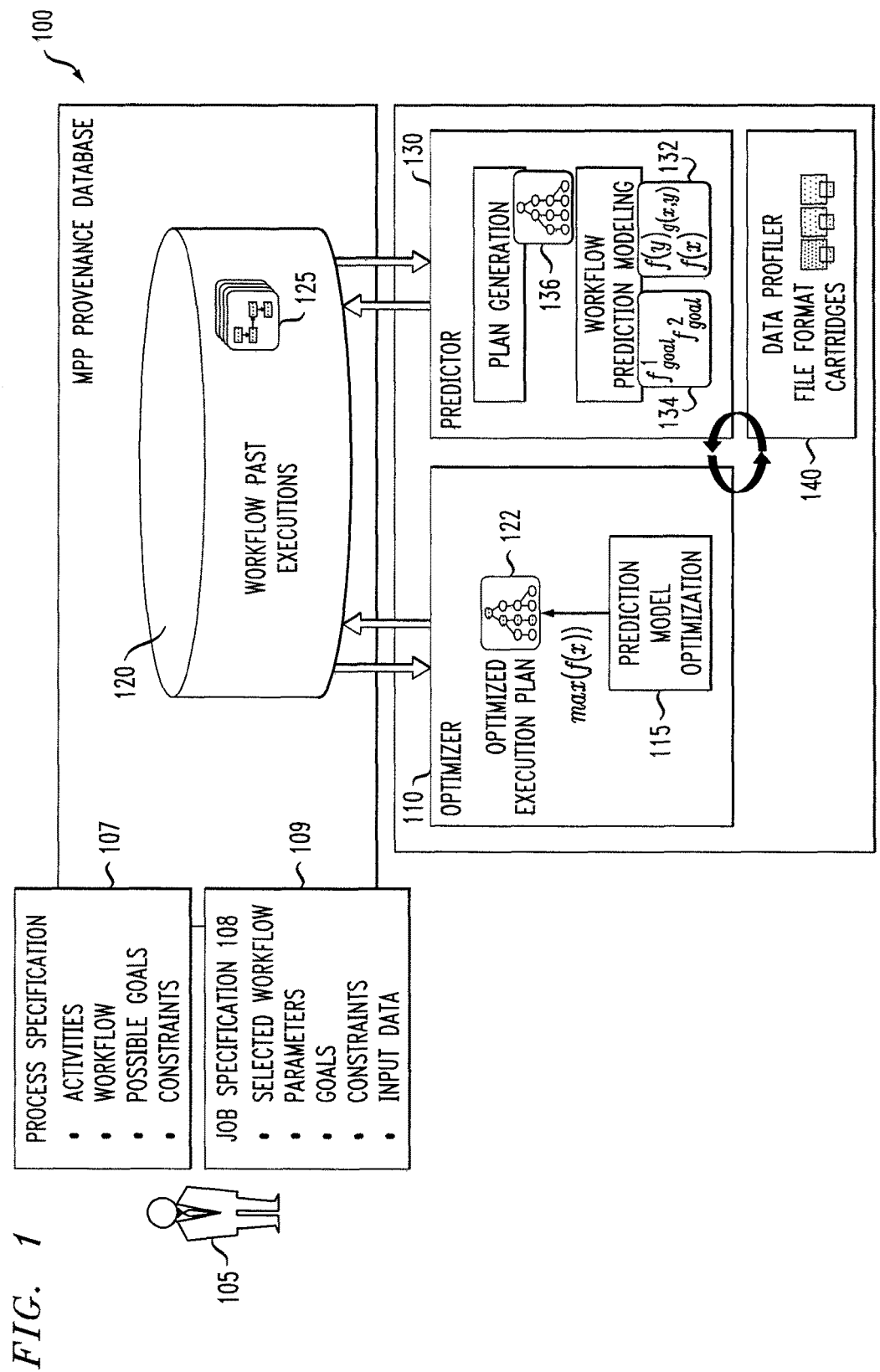
FIG. 1 illustrates an overview of an exemplary workflow optimizer and analysis system that incorporates aspects of the present invention.

Illustrative embodiments of the present invention will be described herein with reference to exemplary communication, storage and processing devices. It is to be appreciated, however, that the invention is not restricted to use with the particular illustrative configurations shown. Aspects of the invention provide methods and apparatus for analytical processing of provenance data for HPC workflow optimization.

According to one aspect of the invention, a prediction method is provided to estimate how a specific instantiation of the workflow will behave when a certain input is processed. The exemplary method creates prediction models based on provenance data from previous executions. Basic provenance data essentially corresponds to data about the execution, and meta-data about input and output files. In order to create prediction models, the exemplary method works with an extended concept of provenance data. The exemplary method automatically extracts and collects relevant description features of the workflow behavior by exploring not only the basic provenance data but also the content of input and output data. Description features are split in two parts: input and output features. Input features are extracted from input data and their basic provenance while output features are extracted from output data, their basic provenance, and data collected while monitoring the execution that produced the output data, such as execution time and memory usage. Prediction functions are then created to estimate output features based on input features for each application. These functions are considered together to create global prediction models for each output feature that the user might want to optimize.

According to another aspect of the invention, a scientific workflow optimization approach is provided. The prediction models are used by the optimization approach to choose the best instantiation of a workflow for given input data and user optimization goal. Yet another aspect of the invention provides a system architecture for the analytical processing of provenance data for optimization of HPC workflow execution. The disclosed system architecture provides the analytical power, storage flexibility and fast provenance data ingestion for the analytical processing of provenance data for optimization of HPC workflow execution.

Challenges of Optimizing HPC Workflow Execution

As noted above, many scientific and engineering experiments require the execution of several applications. These applications are programs that typically process computational models to simulate natural phenomena. They are typically part of a data-flow with many other applications that run different algorithms with many flavors, such as: batch programs, scripts, Hadoop jobs, message passing interface (MPI) programs and others. A chain of applications can be modeled as an HPC workflow, wherein each application is an activity of the workflow and the links between the activities represent the data flowing through the scientific/engineering process. Many combinations of parameters are explored through the workflow on a typical parameter sweep scenario. In this way, every activity of the workflow is typically executed by means of many parallel instances, which are coordinated by the workflow engine.

HPC workflows are subject to different types of optimization, such as execution time optimization, resource utilization and accuracy, among others. The design of a scientific workflow can vary depending on what users want to optimize because there are many issues to be taken into consideration in the process, such as:

(i) A same task of the workflow can be executed by different applications and the one task that is more suitable for the input data and user's goals might vary;

(ii) Applications within the scientific workflow have parameters that can be adjusted to improve their performance;

(iii) The execution engine (e.g., Hadoop) also has parameters that can be adjusted; and (iv) The order that the applications are chained in the workflow can influence in the execution performance.

Thus, the user may not be able to design an optimized workflow for every combination of goals and input data. Additionally, since the same HPC workflow is explored several times under different circumstances, the optimization for one case may not work well on another case. For example, when users start to explore a problem, they may want to optimize workflow execution to run the workflow faster in order to quickly obtain an overview of the model behavior. However, when the users need to validate a hypothesis, they may want to optimize workflow execution to maximize the accuracy of the results.

Alternative Activities and their Order

When users design a workflow, they can choose different alternative programs to use for an activity. For instance, an activity to simulate a physical process might be able to use one of two different programs, each one with its own accuracy and performance. In some situations, the order of the activities of the workflow can also be altered, impacting the outcome of the workflow. A given order of activities could privilege execution time, for example, while another order would privilege the quality of the results. Depending on the goal of the user, it is also difficult to find the best order of activities that optimizes the workflow. The choice of the best programs and the best order depends on the input dataset and the goal of the user. It is thus important to tackle this problem in order to optimize workflows.

Global Optimization

When users start an HPC workflow, they may have different goals, such as high accuracy, short execution time or low cost. For instance, if the goal of the user is to optimize the workflow execution time, it is possible to make each activity run as quickly as possible. However, this "greedy" approach may not be the best global optimization for the workflow. For example, among workflow activities, there are usually filtering activities that reduce the amount of data to be processed in subsequent steps. Assume that a filtering activity can be executed by two different alternative filters. A filter that runs more quickly can be selected at the expense of filtering less data, but the subsequent activities of the workflow will probably take longer because there are more data to be processed. A global optimization can instead choose to run a slower filter that can filter more data, reducing the effort of the remaining activities of the workflow. The relationships between different features of the activities is a relevant problem that needs to be taken into consideration for optimization.

Parameter Settings

When users select an input dataset to be explored, they may not know the best combination of parameters to process such data throughout the workflow. The parameters might belong either to the settings of algorithms or to settings of the execution engine. Although users can set some parameters by themselves, it is a problem to find the remaining combination of parameters that optimizes the execution according to users' goals.

Collecting Provenance Data

Workflow optimization involves storing a large amount of information about past executions in order to build a knowledge base. Current experiments can involve intense data processing using thousands of distributed resources. Aspects of the present invention allow large amounts of provenance data to be captured efficiently and quickly in a distributed environment, without compromising the overall performance of the workflow execution.

Thinking Ahead

The best execution plan for a workflow may take some time to be computed. However, when users submit workflows to run, the workflow management system cannot wait for a long optimization procedure. To speed-up the process, the necessary prediction models can be pre-computed based on past executions. However, it is a challenge to predict the behavior of future executions of the workflow, which depend on input data values that are not yet known.

Analytical Processing of Provenance Data for HPC Workflow Optimization

As noted above, various aspects of the invention provide methods and apparatus for analytical processing of provenance data for HPC workflow optimization. While the invention is illustrated herein primarily in the context of the optimization of exemplary HPC workflows, the present invention can be applied to the optimization of any workflows, as would be apparent to a person of ordinary skill in the art.

FIG. 1 illustrates an overview of an exemplary workflow optimizer and analysis system 100 that incorporates aspects of the present invention. As shown in FIG. 1, the exemplary workflow optimizer and analysis system 100 comprises an optimizer module 110, an MPP (massively parallel processing) provenance database 120, a predictor module 130 and a data profiler 140. The user 105 provides process specifications 107 that define the activities, how to combine the activities into workflows satisfying constraints and possible optimization goals. The predictor 130 generates sets of possible execution plans 136 for the workflows and, in addition, creates global prediction models 134 that estimate relevant description features assigned to each execution plan 136. In order to create the prediction models 134, the predictor 130 analyzes the values of the description features in previous executions of the workflows, which are extracted by the data profiler 140 from basic provenance data and from the actual input and output data, as discussed further below. When the user 105 requests the execution of the workflow, the user 105 provides a job specification 108 defining the workflow to be executed, parameters, constraints on the execution, input data 109 and goal. According to the job specification 108, the optimizer 110 explores optimizations in the workflow execution plans 136 to choose an optimized plan 122 to be executed. All provenance data, including the basic provenance data and the extracted description features, are stored in the MPP provenance database 120. The predictor 130 uses the analytics capabilities of the MPP provenance database 120 to build the prediction models 134. All user input, related to the process specification 107 and job specification 108, the execution plans 136, the prediction models 134 and optimized plans 122 are also stored in the MPP provenance database 120.

As discussed further below in conjunction with FIGS. 2 through 4, prediction functions 132 are created by the predictor 130 to estimate output features based on input features for each application that can execute a workflow activity. These prediction functions 132 are considered together to create global workflow prediction models 134 for each output feature the user might want to optimize. When a workflow has to be executed, these prediction models 134 are consulted by the optimizer 110 to choose the best instantiation of the workflow for given input data 109 and user optimization goal. This instantiation is an optimized plan 122 which is stored in the MPP provenance database 120 before being executed.

The various components of the workflow optimizer and analysis system 100 are discussed further below in conjunction with FIG. 5.

Before executing a workflow, the user 105 informs the process specification 107, containing the several activities that are part of the workflow and one or more goals for which the workflow might need to be optimized. This information is applied to the exemplary workflow optimizer and analysis system 100. The data profiler 140 is then able to continuously extract the description features related to the execution of activities of the workflow.

Based on the workflow definition in the process specification 107 provided by the user 105, the workflow optimizer and analysis system 100 generates sets of execution plans 136 for each workflow. Over time, the execution plans 136 are executed several times as users 105 submit their workflows to execution. Based on these past executions 125, the predictor 130 builds a complete prediction model 134 for each execution plan 136 and for each relevant feature associated with the performance of the workflow such as execution time, resource utilization, accuracy or any other metric. When users 105 request the execution of a workflow, they must provide the job specification 108, including the input data, parameters and their optimization goal with respect to workflow performance. As discussed further below, the workflow optimizer and analysis system 100 will select the output feature associated with that goal to be optimized. For each possible execution plan 136, there is a prediction model 134 for this output feature that can estimate a value for it by propagating predictions from the workflow input 109 provided by the user.

The prediction models 134 use input features of the workflow as input. However, some of these features are parameters of either the program or the execution engine. These parameters can be left unset to be explored by the workflow optimizer and analysis system 100, as discussed further below in conjunction with FIG. 4, to optimize the workflow with respect to different scenarios. The execution plan 136 in which the prediction model 134 provides the highest maximization is selected to be executed. The variables not originally set by the user 105 are set based on the outcome of the optimization process.

An activity is an abstract representation of a basic task, which can be executed by different alternative programs. Thus, the provenance database has a set $\Psi=\{Y_1, Y_2, \ldots, Y_u\}$ of known activities. For each activity $Y_k \in \Psi$, there is a set $V_k=\{r_1, r_2, \ldots, r_a\}$ of alternative programs that implement activity $Y_k$.

For each activity $Y_k \in \Psi$, the user 105 provides the provenance data specifications that are assigned to the activity. As discussed further below in conjunction with FIG. 2, the provenance data in the MPP provenance database 120 is composed of both basic provenance data and description features that provide additional information about the input, output and execution of the workflows. This is a generalization of provenance as described by J. Freire et al., "Provenance for Computational Tasks: A Survey," *Computing in Science & Engineering*, 10(3), 11-21. doi:10.1109/MCSE.2008.79 (2008). When an activity $Y_k$ is going to be executed, the activity $Y_k$ receives a set of input tuples and generates a set of output tuples, the attributes of which are usually references to external files and relevant values extracted from the files (such as important values that influence the performance). A program $r_x \in V_k$ is chosen to execute the activity and several instances of $r_x$ are executed in parallel to consume the input tuples, generating output tuples. The workflow system prepares the input of each instance based on the input tuples and creates output tuples based on the results of the execution. In addition, execution data such as execution time, used resources, among others, are also collected. All alternative programs in $V_k$ should be compatible with $Y_k$'s provenance data specifications. Programs can be either database operations or external programs. In the first case, tuples are directly manipulated by the workflow system. In the second case, the user 105 has to provide wrappers to prepare the input of the programs based on the input tuples and create output tuples from the actual output.

Let $D_{Input}$ be the set of all possible input tuples and, analogously, let $D_{Output}$ be the set of all possible output tuples for $Y_k$. Each instance of $r_x$ processes a set tuples Input$\subseteq D_{Input}$ and generates a set of tuples Output$\subseteq D_{Output}$. The part of provenance data associated with the execution of a program $r_x \in V_k$ is an execution tuple Exec $E \in D_{Exec}$ wherein $D_{Exec}$ corresponds to all of the possible values for Exec. The attributes of Exec are typically the execution time, used memory, and other relevant information that could be worth recording for the execution of each instance.

Extraction of Description Features from Provenance Data

The prediction models 134 are created by analyzing provenance data in the MPP provenance database 120 related to the HPC workflow execution, which includes input and output data from previous executions 125. Traditional provenance data contains the history of data, the time spent on past executions, the profile of the machines that executed them, the users that requested the execution and the parameters chosen by the user.

According to one aspect of the invention, the workflow optimizer and analysis system 100 also extracts sets of features from inside the files that are referenced by the basic provenance data. In this manner, the workflow optimizer and analysis system 100 systematically collects information associated with the workflow execution and formally structures the information as features to be later analyzed. The data collection includes domain information extracted from files by data profiling cartridges. Such an extraction occurs in parallel on a separate execution environment without interfering in the workflow execution performance.

Figure 2:
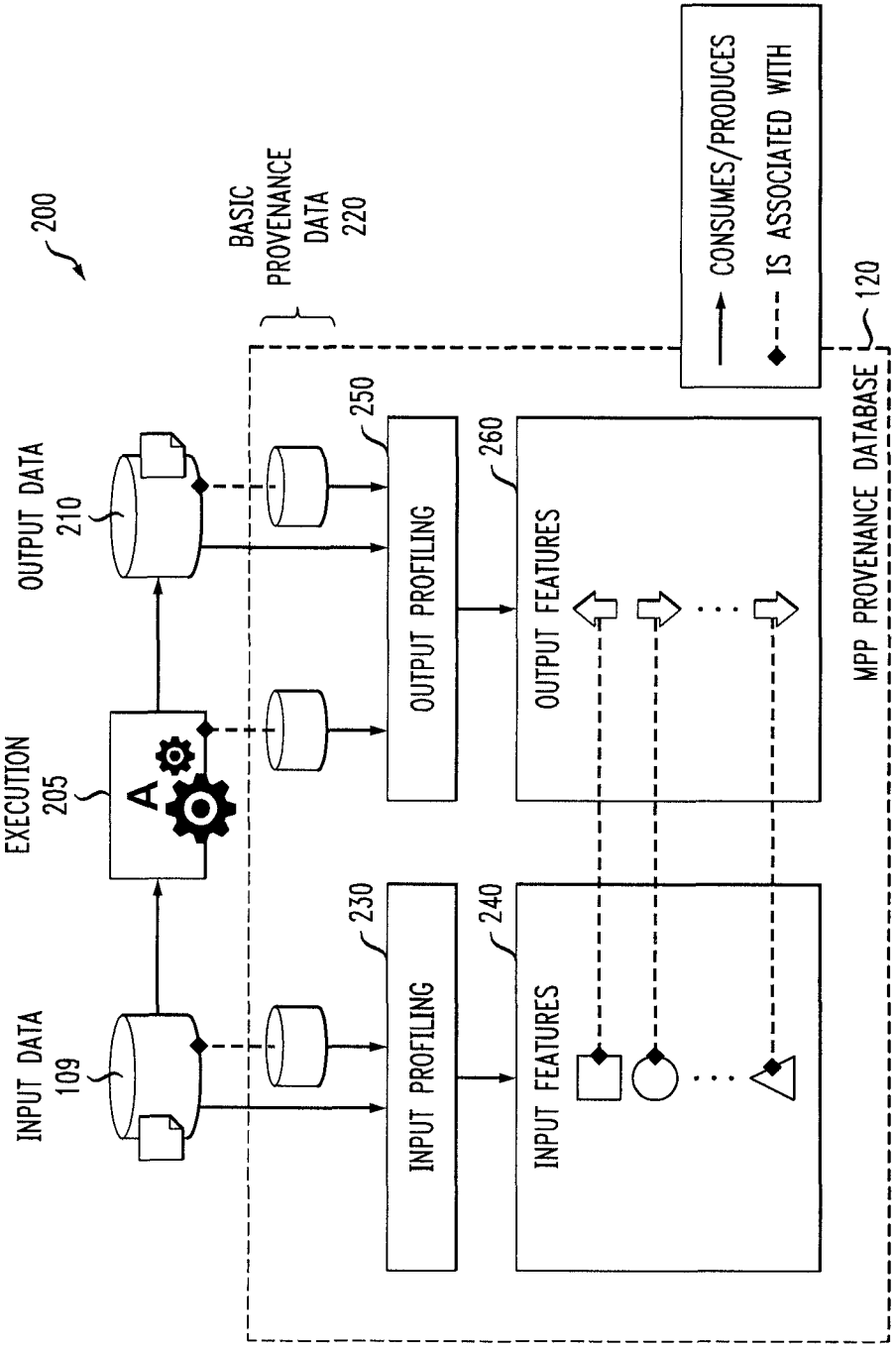
FIG. 2 illustrates an exemplary feature extraction process incorporating aspects of the present invention.

FIG. 2 illustrates an exemplary feature extraction process 200. As noted above, the prediction model optimization 115 extracts relevant features from user input data 109, output data 210 generated by a workflow activity execution 205 for a particular exemplary activity A, and basic provenance data 220 in the MPP provenance database 120. For example, assume a user 105 wants to compress a large file as part of a workflow. In order to compress this file, it is necessary for the user 105 to specify some parameters. In addition, the file has provenance data 220 associated with it, such as file type, size, name, directory path and information about how it was generated. Besides collecting basic provenance data, the data profiler 140 also uses input profiling cartridges 230 to extract relevant information from the actual input data. For instance, the exemplary data profiler 140 calculates the file entropy, sampling rates and other domain specific metrics. All of the extracted and calculated information is stored as input features 240 being available to be correlated with extracted output features 260.

After the execution of the exemplary compression activity, the output profiler 250 collects output features 260 from the data related to the workflow execution 205 such as how long it took to execute the program, central processing unit (CPU) and memory usage, etc. In addition, the output profiling cartridges 250 are used to extract specific relevant output features 260 from the output files such as the internal organization of the compressed files.

The database of features grows as new workflows are executed, and after some time, there will be enough data to be analyzed. By doing that, it is possible to understand the variability of the input features 240 and evaluate how their choice affects the output features 260. This analysis can be done by the users 105 themselves or automated as described herein.

Features 240 and 260 of an activity $Y_k$ correspond to aggregate descriptions extracted from complete executions 205 of activity $Y_k$, i.e., taking into account the execution of all instances. Features 240 and 260 can be execution parameters, statistics, meta-data and relevant values extracted from input and output files. Each activity $Y_k \in \Psi$ has a set of input features 240 (IF$^{Y_k}=\{p_1, p_2, \ldots, p_n\}$) and a set of output features 260 (OF$^{Y_k}=\{q_1, q_2, \ldots, q_m\}$). Each input feature 240 ($p_i \in $IF$^{Y_k}$) is extracted from input data 109 by an input profiling function 230 ($e_i: \wp(D^{Input}) \to \mathbb{R}$, wherein $\wp(D^{Input})$ is the power set of $D^{Input}$). This input profiling function 230 maps the set of all input tuples into a numeric value. Analogously, each output feature 260 ($q_j \in $OF$^Y$) is extracted by an output profiling function 250 ($e_j: \wp(\wp(D^{Output}) \times D^{Exec}) \to \mathbb{R}$) that analyzes the output data 210 and execution data from execution 205 to extract a relevant characteristic of the results. Notice that, for the execution of each instance, there is a pair composed of a set of output tuples and an execution tuple. An output feature 260 extracts its value from all such pairs corresponding to the total execution of the activity.

Since input data 109 and output data 210 might contain references to domain-specific file formats, the exemplary data profiler 140 uses input and output profiling cartridges 230 and 250 (that contain sets of profiling functions) for extracting features from each type of data. Other features, such as the total execution time of the activity are automatically calculated by the workflow system. Consider Dom($p_i$), $1 \le i \le n$ as the set of possible values of the feature $p_i$. Dom($q_i$) is analogous. Notice that it is assumed that Dom($p_i$) and Dom($q_i$) are subsets of $\mathbb{R}$.

In order to define a workflow, the user 105 needs to select w activities and define their partial order as part of the process specification 107. In the process specification 107, the user 105 also defines the data dependencies between activities and associates the input features of every activity with output features of previous activities. In order to associate input features of an activity Y with output features from previous activities, the user 105 must specify for every $p_i \in $IF$^Y$, a function $f(q_1, q_2, \ldots, q_m)$ wherein, for each $q_1$, $1 \le j \le m$, there exists an activity Z such that Z preceeds Y (Z>Y) and $q_j \in $OF$^Z$.

As noted above, based on the workflow definition provided by the user, the workflow optimizer and analysis system 100 generates sets of execution plans 136 for each workflow. An execution plan 136 corresponds to a set of activities, their partial order and the definition of which programs are actually used to run them. The workflow W has w activities and each activity $Y_k$, $1 \le k \le w$, of the workflow has a set $V_k$ of alternative programs. There is thus a set of $|V_1 \times V_2 \times \ldots \times V_w|$ execution plans 136, all of them compatible with the partial order defined by the user 105. In addition, the workflow optimizer and analysis system 100 takes into consideration algebraic transformations that create equivalent execution plans for the workflow. Each activity of the workflow is associated with an algebraic operator. An algebra is a good basis for optimization and provides semantics that allows for changing the order of the workflow activities to find a better plan. There are different existing workflow algebras that can be explored by the workflow optimizer and analysis system 100. See, for example, E. Ogasawara et al. "An Algebraic Approach for Data-Centric Scientific Workflows," *Proc. of VLDB Endowment*, 4(12), 1328-1339 (2011) and/or C. Olston et al., "Pig Latin: a N-So-Foreign Language for Data Processing," *Proc. of the 2008 ACM SIGMOD Int'l Conf. on Management of Data—SIGMOD '08*, p. 1099 (2008), each incorporated by reference herein.

Generating Prediction Functions

The prediction of features 240 and 260 create the basis for the optimization, establishing comparison metrics between HPC workflow executions. In order to do that, the workflow optimizer and analysis system 100 builds prediction functions for each activity stored in the provenance database, correlating input features 240 with output features 260. Thus, the purpose of a prediction function of a given activity is to predict an output feature based on the set of input features. The workflow optimizer and analysis system 100 thus aims to find a prediction function:

$$f_{qj}: Dom(p_1) \times Dom(p_2) \times \ldots \times Dom(p_n) \to Dom(q_1)$$

$$f_{qj}(p_1, p_2, \ldots, p_n) = \bar{q}_j$$

such that $\bar{q}_j$ is a predicted value for an output feature $q_j$, $1 \le j \le m$, based on the set of input features $\{p_1, p_2, \ldots, p_n\}$. In order to illustrate the model, consider that $\bar{q}_j$ can be obtained by a linear combination of the input features. Thus, the prediction function $f_{qj}$ will have the following structure $$f_{qj}(p_1, p_2, \ldots, p_n) = \beta_0 + \beta_1 p_1 + \beta_2 p_2 + \ldots + \beta_n p_n + \epsilon.$$

Thus, considering the input values for $p_1, p_2, \ldots, p_n$, in order to predict $\bar{q}_j$ the approximate values for the coefficients $\beta_1, \beta_2, \ldots, \beta_n$ are needed. This is a typical regression problem. The MPP provenance database 120 comprises the history of previous executions 125 of the workflow activity. There are d execution instances of activity Y. As values of all input features $v_k^{p_1}, v_k^{p_2}, \ldots, v_k^{p_n}$ have been observed, for $1 \le k \le d$, as well as the respective obtained value of $q_j$, namely $v_k^{q_j}$, these observed values can be used to calculate the coefficients by solving this regression problem:

$$\begin{bmatrix} v_1^{q_j} \\ v_2^{q_j} \\ \vdots \\ v_d^{q_j} \end{bmatrix} = \begin{bmatrix} v_1^{p_1} & v_1^{p_2} & \ldots & v_1^{p_n} \\ v_2^{p_1} & v_2^{p_2} & \ldots & v_2^{p_n} \\ \vdots & \vdots & & \vdots \\ v_d^{p_1} & v_d^{p_2} & \ldots & v_d^{p_n} \end{bmatrix} \begin{bmatrix} \beta_1 \\ \beta_2 \\ \vdots \\ \beta_n \end{bmatrix} + \begin{bmatrix} \epsilon_1 \\ \epsilon_2 \\ \vdots \\ \epsilon_n \end{bmatrix}$$

where $v_k^{q_j}$ are the response variables, $v_k^{p_1}, v_k^{p_2}, \ldots, v_k^{p_n}$ are the exploratory variables, $\beta_1, \beta_2, \ldots, \beta_n$ are the regression coefficients and $\epsilon_1, \epsilon_2, \ldots, \epsilon_n$ are the error terms. The error E in the prediction formula can be used to estimate the precision of the prediction. The workflow optimizer and analysis system 100 also uses a cross-validation approach to build the prediction formulas. The coefficients $\beta_1, \beta_2, \ldots, \beta_n$ are calculated using a training set of provenance data and an average error of the prediction is estimated with a testing set. If the error is above a given threshold, the workflow optimizer and analysis system 100 might search for another prediction function using other approaches (e.g., non-linear regressions or neural networks).

Consider a feature of the workflow that the user 105 wants to optimize. For instance, this feature may be associated with the quality of the produced results. This feature is an output feature s of the last activity of the workflow, namely, W. Consider $I^W = Dom(p_q) \times Dom(p_2) \times \ldots \times Dom(p_n)$ as the set of all possible combinations of values for the input features of W. There is a prediction function for the feature s, namely $e_s: I^W \to Dom(s)$.

$$e_s(p_1, p_2, \ldots, p_n) = \beta_0 + \beta_1 p_1 + \beta_2 p_2 + \ldots + \beta_n p_n + \epsilon$$

Thus, in order to predict s, the values for several input features $p_i \in IF^w$ are needed. However, prior to the execution of the workflow, the workflow optimizer and analysis system 100 does not know these values. It is important to remember that the user 105 specified for each $p_i \in IF^W$ an association function $f_i(q_1, q_2, \ldots, q_m)$ such that each $q_1, 1 \le j \le m$ is an output feature from a previous activity $|Z > W$. To simplify the notation, describe $Q_i$ as the tuple $(q_1, q_2, \ldots, q_m)$. In this way, $p_i = f_i(Q_i)$.

The workflow optimizer and analysis system 100 can use this function to replace all $p_i \in IF^W$:

$$e_s(f_1(Q_1), f_2(Q_2), \ldots, f_n(Q_n)) = \beta_0 + \beta_1 f_1(Q_1) + \beta_2 f_2(Q_2) + \ldots + \beta_n f_n(Q_n) + \epsilon.$$

The value of $f_i(Q_i)$ depends on the values $(q_1, q_2, \ldots, q_m)$. Each $q_j$ represents an output feature from a previous activity Z. In this way, the process can be recursively applied to detect how each $q_j$ can be estimated. At the end, there will be a function $rec\_e_s: I^O \to Dom(s)$, where $I^O$ represents the set of all possible combinations of values for the workflow input features. By using this function, it will be possible to predict the value of s based on the features that are directly extracted from the workflow input.

There will be a different prediction model 134 with respect to s for each possible execution plan 136 since the activities of the workflow can use different programs and parameter combinations, thus impacting in the prediction functions of the individual activities.

The following exemplary rules are used to control the method of prediction of features:

1. The users 105 record the activities that might occur in the workflows, describing the alternative programs for their execution as well as input and output features.

2. The users 105 define workflows combining the recorded activities. In addition, the users 105 specify all possible optimization goals for the workflows. Notice that an activity might be part of different workflows. When specifying a workflow, the users 105 need to describe the mapping between the input features of each activity to the output features of previous activities. Based on the definition of the workflow, the workflow optimizer and analysis system 100 generates all possible execution plans 136.

3. The execution of any activity by a program generates provenance data that is stored in the MPP provenance database 120 for future use. Values for the input and output features 240 and 260 are also automatically computed and stored.

4. Whenever there is enough provenance data for an activity, the workflow optimizer and analysis system 100 generates prediction functions of the output features 260 based on input features 240.

5. Whenever there are prediction functions defined for all the activities of a workflow, prediction models 134 are generated for all possible output features 260 that can be associated with the users' goals.

6. Whenever the execution 125 of a previously recorded workflow is requested and there are prediction models 134 for its optimization, the prediction models 134 are evaluated for all execution plans 136 and the workflow optimizer and analysis system 100 chooses the best option. If there are no computed prediction models 134 for the workflow, the execution plan is randomly chosen.

Figure 3:
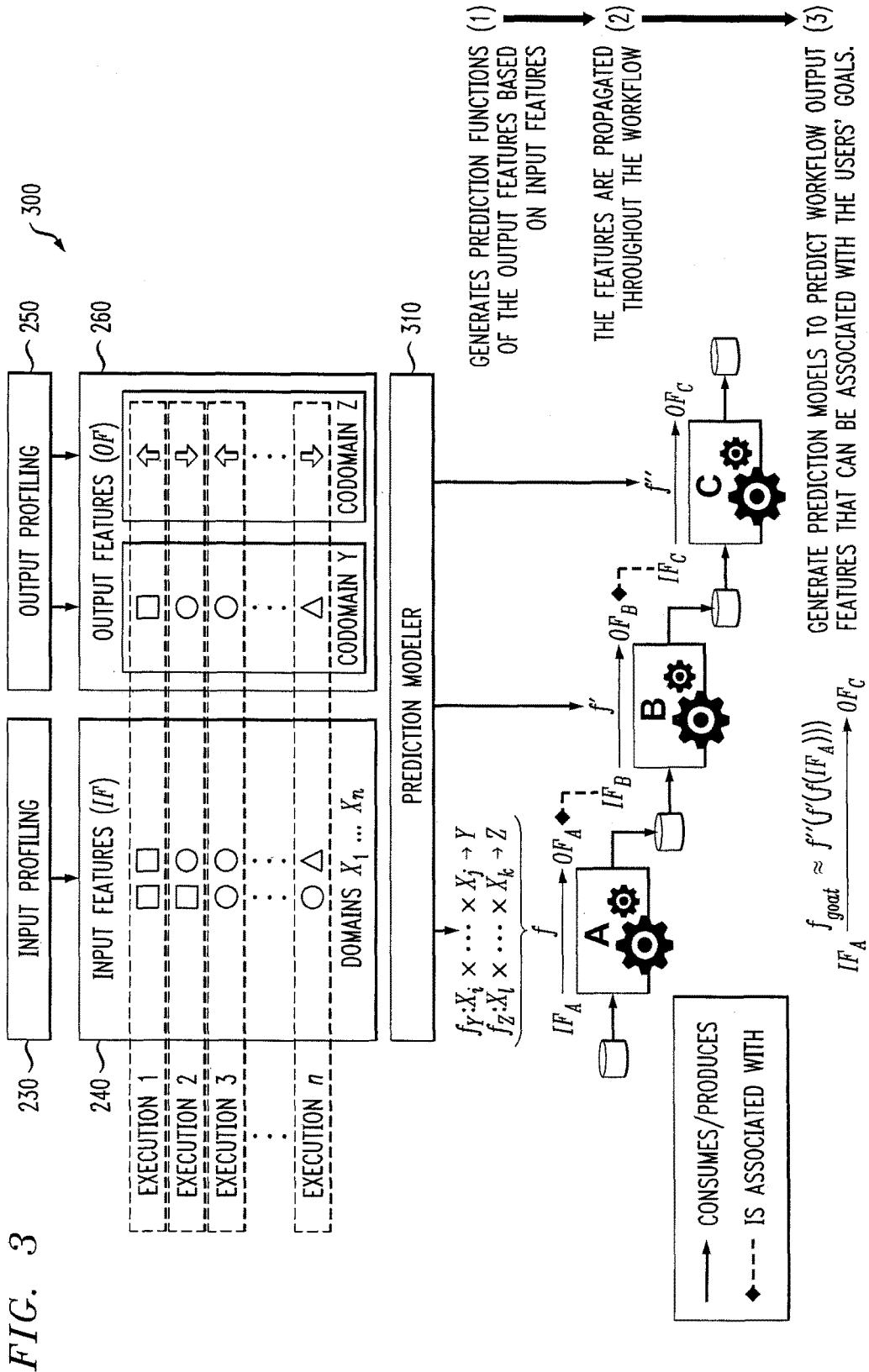
FIG. 3 illustrates an exemplary prediction model creation process that creates prediction models based on the extracted input and output features of FIG. 2.

FIG. 3 illustrates an exemplary prediction model creation process 300 that creates prediction models 134 based on extracted input and output features 240 and 260. Boxes A, B and C represent workflow activities, which are chained one after the other in the exemplary embodiment. Different programs can execute each workflow activity. For the sake of simplicity, assume that each activity has only one input feature and one output feature. Activities A, B and C have input features $IF_A$, $IF_B$, and $IF_C$, and output features $OF_A$, $OF_B$, $OF_C$, respectively. In addition, $OF_C$ corresponds to the user's goal to be optimized. In step (1), a prediction modeler 310 uses machine learning techniques to create, for each program that can execute an activity and for each output feature, a prediction function (such as $f_Y$, $f_Z$, ...) that can provide a good approximation of the specific output feature 260 when this program is executed to perform the corresponding activity. The workflow optimizer and analysis system 100 needs to predict how this feature is affected by the initial input data 109 of the workflow. In step (2), the prediction modeler 310 identifies the chaining of features. It detects, for instance, that for an execution plan that combines specific programs for the execution of A, B and C, $OF_C$ can be estimated by means of propagating the values of functions $f$, $f'$ and $f''$, since $OF_A$, predicted by $f$, is mapped into $IF_B$, and $OF_B$, predicted by $f'$, is mapped into $IF_C$. In step (3), the prediction modeler 310 creates the prediction model 134 to estimate $OF_C$ based on the combination $f$, $f'$ and $f''$.

As each activity A, B, C can be executed by different programs, multiple prediction models 134 are generated, one for each possible combination of programs. In general, there are also multiple input and output features for each activity and the process combines multiple prediction functions to create each prediction model 134. These prediction models 134 are available for workflow optimization taking into account each possible specific initial input data 109, as described herein.

Workflow Optimizer

As noted above, the workflow optimizer 110 performs an optimization based on the prediction models 134 for each possible execution plan 136. When users 105 submit a workflow to be executed, the users 105 usually set several input parameters and choose the programs to be run for some activities and setup several settings of the execution environment. All of these variables are input features 240 specified by the user 105 that are combined with other input features 240 extracted from the data to determine how the workflow will behave. The user 105 can opt to leave several of these input parameters open for the workflow optimizer and analysis system 100 to choose the best value for the execution. For instance, the user goal may be to optimize execution time without restricting which programs should be used to execute the activities. In another scenario, the user 105 can specify the programs for some of the activities but leave several parameters open.

The workflow specification has a set of w activities and each activity $Y_k$, $1 \leq k \leq w$ of the workflow has a set $V_k$ of alternative programs. An execution plan x 136 for a workflow corresponds to a tuple $\langle IF_x, a_x, c_x \rangle$ where:

$IF_x$ corresponds to the input features of the workflow;

$a_x$ contains a different combination of programs for the activities, i.e., $a_x \in V_1 \times V_2 \times \ldots \times V_w$;

$c_x$ corresponds to a set of constraints specified by the user during the specification of the process 107 and other constraints added during the plan generation (the main example of constraints is the order of the activities of the workflow, but other constraints related to the description features are also possible).

When the user 105 provides the job specification 108, the user 105 defines the workflow, some parameters, the input data and the goal. Part of $IF_x$ is automatically defined based on the parameters and the extraction of features from input data. Another part ($IF_{open}$) might be left open by the user 105. In addition, the user might specify some additional constraints $c_{job}$ for the execution of the workflow.

When the workflow is going to be executed, the exemplary workflow optimizer and analysis system 100 extracts the input features from the input data and selects all the possible execution plans 136 for that workflow. The input features that are left open ($IF_{open}$) are identified and the following optimization is performed for each execution plan x:

$$IF_{open}^{optimal} = \arg\max_{IF_{open}} (f_{goal}^x(IF_x)) \text{ subject to: } c_{job}$$

$$m_x = f_{goal}^x(IF_x^{optimal})$$

where $IF_x^{optimal}$ corresponds to the assignment of $IF_{open}^{optimal}$ to $IF_{open}$ in $IF_x$. The optimization is presented here as a maximization problem, but if the goal is a minimization, the process is analogous.

Each value $m_x$ is the maximum value of the prediction function $f_{q_{goal}}^x$ that predicts the output feature 260 associated with the user's goal. Notice that the exemplary maximization takes into account any additional constraints $c_{job}$ imposed by the user. There is a different prediction model for each execution plan. The workflow optimizer and analysis system 100 calculates then all the maximizations and selects the execution plan where the respective $m_x$ has the maximum value among all the other calculated maximizations. In other words, the workflow optimizer and analysis system 100 maximizes all possible models 134 and picks the best one. The best optimized model 134 contains the combination of input features 240 that predicts the maximum value for $q_{goal}$. The features that were not originally chosen by the user are the exploratory variables used by the workflow optimizer and analysis system 100 to optimize the model 134. When the optimization finds the maximum of the function, the workflow optimizer and analysis system 100 has the best values for those input features 240, which are used to run the workflow. If the users 105 set all possible input features 240 of the workflow, the workflow optimizer and analysis system 100 can only choose the best combination of activities by picking the best prediction for each execution plan. If the users 105 also specify the combination of programs they want to use for every activity, the workflow optimizer and analysis system 100 will only be able to inform the predicted value for the desired goal.

Users often want to optimize the workflow with respect to a specific goal while taking into consideration other several constraints. For example, consider that users 105 want to optimize the workflow execution time, but they do not want the quality of the results to be below a threshold $T \in \mathbb{R}$. The feature that measures execution time is $q_{time}$ and the feature that measures quality is $q_{quality}$. Thus, the workflow optimizer and analysis system 100 needs to optimize $q_{time}$ subject to the constraint $q_{quality} \geq T$. In this situation, the workflow optimizer and analysis system 100 might use linear and non-linear programming (D. G. Luenberger and Y. Ye, "Linear and Nonlinear Programming," Google eBook, 564 (Springer, 2008)) as well as constraint programming (R. Fourer and D. M. Gay, "Extending an Algebraic Modeling Language to Support Constraint Programming," *INFORMS Journal on Computing*, 14(4), 322-344 (2002)) to search for the best combination of open input features to be used in the execution plan.

Figure 4:
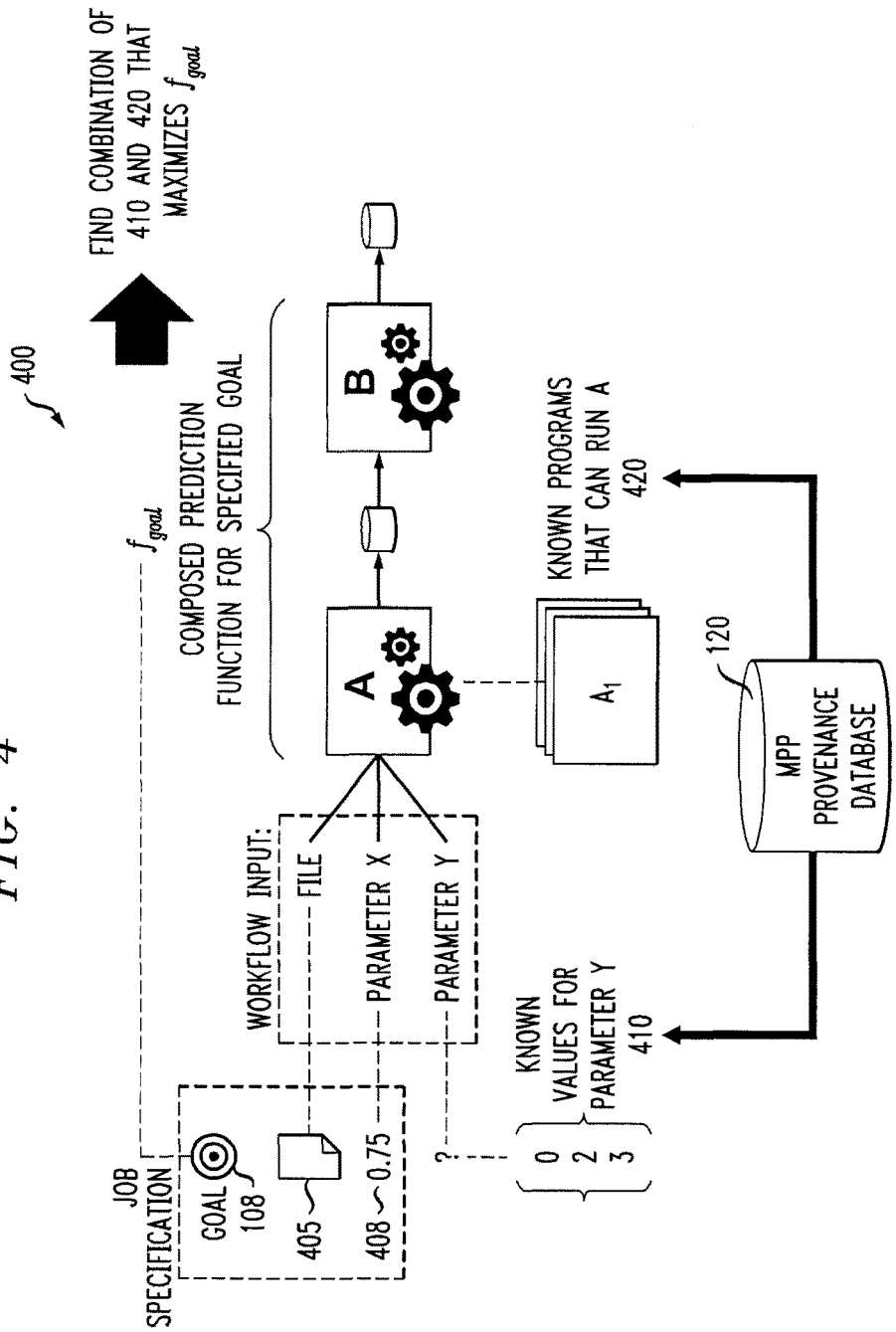
FIG. 4 illustrates an exemplary optimization process in accordance with aspects of the present invention.

FIG. 4 illustrates an exemplary optimization process 400 in accordance with aspects of the present invention. As shown in FIG. 4, the job specification 108 comprises a goal specified by the user, for instance, to execute the workflow as quickly as possible. The user 105 gives, as job specification 108, a file 405 and another parameter 408 (0.75). The prediction function $f_{goal}$ that predicts the workflow execution time takes as input a set of features extracted from the input file 405 and the parameters X and Y. However, the user 105 has not set any value for parameter Y nor chosen a specific program to run activity A. As shown in FIG. 4, a set 410 of known values for parameter Y are obtained from the MPP provenance database 120, as well as a set 420 of known programs that can run activity A. As noted above, the MPP provenance database 120 has a set $\Psi = \{Y_1, Y_2, \ldots, Y_u\}$ of known activities. For each activity $Y_k \in \Psi$, there is a set $V_k = \{r_1, r_2, \ldots, r_a\}$ of alternative programs that implement activity $Y_k$. Therefore, the workflow optimizer and analysis system 100 has the opportunity to optimize the function $f_{goal}$, searching for the most appropriate combination of value for parameter Y 410 and program for activity A 420 that improves the workflow performance (i.e., maximizes the function $f_{goal}$).

The workflow optimizer and analysis system 100 optimizes the prediction models 134 (functions such as $f_{goal}$ in FIGS. 3 and 4) for each execution plan 136, taking into account the actual input data 109 and parameters 408. The optimization process 400 finds the best values for the parameters that were left open. The workflow optimizer and analysis system 100 then chooses the execution plan 136 with the best predicted value for the target output feature 260. The user 105 can also set a restriction, for example, when they need to optimize the execution time and keep the quality of the results above a given threshold, as discussed above. The workflow optimizer and analysis system 100 can explore constraint programming, multi-objective optimization, linear and non-linear programming to optimize the prediction model 134 subject to the constraint.

Exemplary System Architecture

The workflow optimizer and analysis system 100 optimizes the execution of workflows. However, executing scientific experiments in large scale by collecting provenance data from distributed resources is already a complex problem. Thus, an aspect of the invention provides an infrastructure to support the workflow optimizer and analysis system 100. FIG. 5 illustrates an exemplary architecture 500 for the workflow optimizer and analysis system 100 of FIG. 1. Provenance data is collected, execution plans and prediction models are generated and optimizations are performed in parallel with workflow execution. The exemplary architecture 500 aims to execute workflow optimization in accordance with aspects of the invention without compromising the workflow execution performance.

Figure 5:
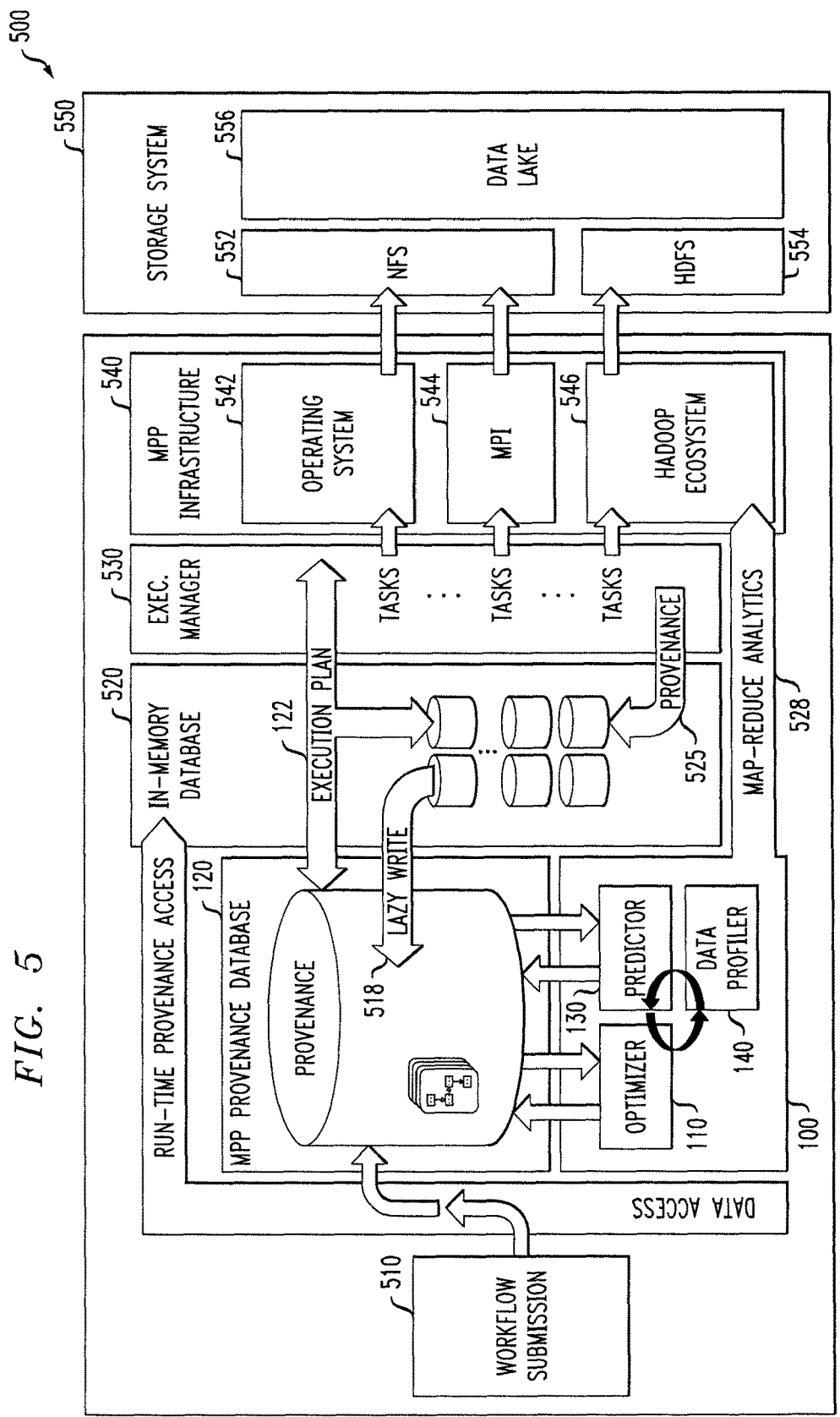
FIG. 5 illustrates an exemplary architecture for the workflow optimizer and analysis system of FIG. 1.

As shown in FIG. 5, when users 105 submit a workflow 510, a first conceptual definition of the workflow 510 is stored into the MPP provenance database 120. An optimized execution plan 122 is prepared for this workflow 510 and the optimized execution plan 122 starts running. The exemplary execution environment is based on different parallel computing approaches that use distinct data access types. The optimized execution plan 122 of the running workflow 510 as well as its run-time provenance data is stored into an in-memory database 520. The exemplary in-memory database 520 works as a fast-data layer that is needed to support the high velocity of provenance data ingestion and access. An execution manager 530 gets new tasks and stores executed tasks (and their provenance 525) directly in the in-memory database 520, improving the throughput of provenance data collection. The data stored into the in-memory database 520 is eventually stored in a main massively parallel processing (MPP) provenance database 120, for example, using lazy write operations 518.

As discussed further below in conjunction with FIG. 6, the workflow optimizer and analysis system 100 continuously analyzes data from the MPP provenance database 515 in order to improve the prediction models 134 and build new optimized execution plans 122.

The exemplary workflow optimizer and analysis system 100 is a fusion of a predictor 130 and an optimizer 110. As noted above, the data profiler module 140 extracts relevant features of data from past executions. Thus, besides the provenance data in the MPP provenance database 120, it also has access to a storage system 550 and an exemplary Hadoop ecosystem 546. The exemplary MPP provenance databases 120 do not store large binary files (rather, they only reference them). Considering that the exemplary Hadoop ecosystem 546 can access data persisted into the storage system 550, Hadoop's analytical capabilities can be employed to analyze this data in a fast and parallel manner. The workflow optimizer and analysis system 100 has the opportunity to have a deeper look into the files referenced in the MPP provenance database 120 to extract features 240 and 260 that are going to be used in the prediction models. The data profiler component 140 analyzes files in the storage system 550 using Map-Reduce analytics 528 on an exemplary Hadoop cluster 546. The data profiler component 140 generates statistics about the files and extracts meta-data and other important values from the files. All of this profile information is stored in the MPP provenance database 120 as features 240 and 260.

During the execution, the workflow optimizer and analysis system 100 queries the in-memory database 520 for partial results and run-time provenance data. Based on run-time analysis, the workflow optimizer and analysis system 100 might evaluate that something is deviating from what had been initially planned. For instance, the value obtained for a feature might be substantially different from the original predicted value, causing poor performance. The workflow optimizer and analysis system 100 can then use the measured feature as the input to optimize a prediction model 134 that represents the remaining steps of the workflow 510.

The exemplary architecture 500 can ingest large amounts of provenance data from all previous executions 125 at high speeds. All input data 109 and output data 210 as well as execution metrics are continuously collected and mined to create prediction models 134 used in the optimization of future executions, as discussed further below in conjunction with FIG. 6. A prediction model evolution process 600 (FIG. 6) evolves the optimization model 134 and the execution plans 136 as new provenance data are collected. The exemplary architecture 500 processes the collected data using parallel capabilities of the execution environment.

According to one aspect of the invention, the exemplary architecture 500 provides a separate infrastructure to optimize the future workflow executions without interfering with the current execution. In addition, the exemplary architecture resorts to the in-memory database 520 to schedule tasks for the execution manager 530 and collect all execution data at high throughput and speed. The data from previous executions 125 is stored within a data lake 556 that is consulted by means of cartridges (executed within the MPP infrastructure 544, e.g., a Hadoop cluster 546) to extract relevant features 240, 260 used in optimization. The storage system 550 also comprises a Network File System (NFS) 552 and a Hadoop Distributed File System (HDFS) 554, in a known manner.

The MPP infrastructure 540 provides the means for the execution of the workflow tasks. The MPP infrastructure 540 allows the execution of Hadoop jobs using the Hadoop ecosystem 546, the execution of programs on top of a conventional operating system 542 and the execution of parallel tasks using the Message Passing Interface (MPI) 544, in a known manner. All of the provenance data is stored within the MPP provenance database 515 so that the provenance data can be later analyzed. These provenance data include all features extracted from execution data and from input/output files.

As discussed further below in conjunction with FIG. 6, a prediction model evolution process 600 continuously creates and refines prediction models 134 within the MPP infrastructure 540 in parallel with the current workflow execution. Whenever the user 105 submits a new workflow execution 510 with a specific goal, the workflow optimizer and analysis system 100 uses the previously generated prediction models 134 to select the best combination of programs and parameters.

Prediction Model Evolution

As noted above, the workflow optimizer and analysis system 100 continuously analyzes data from the MPP provenance database 120 in order to improve the prediction models and build new optimized execution plans.

Figure 6:
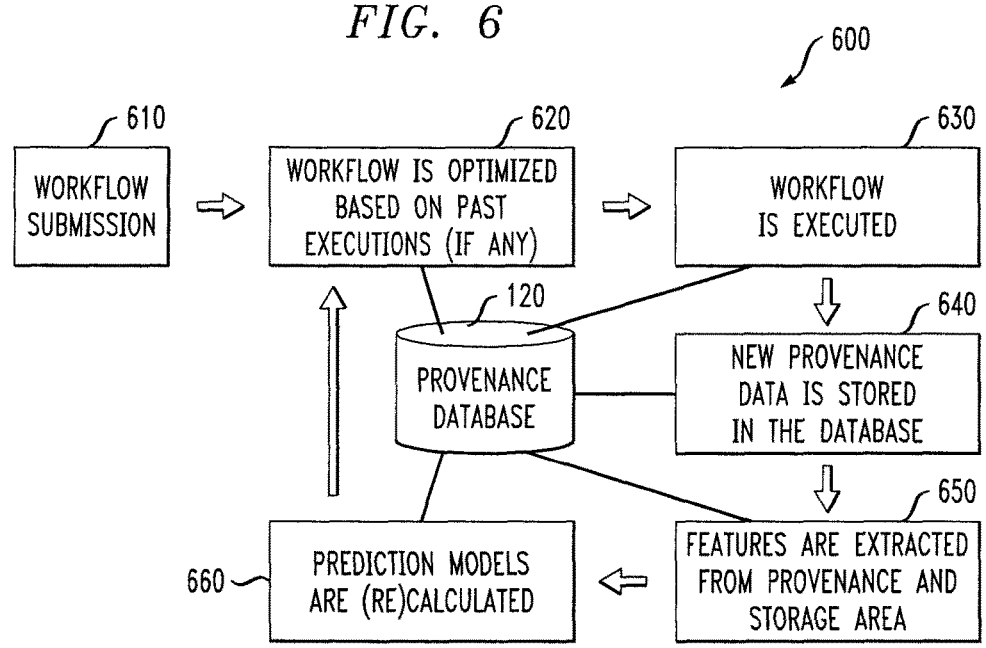
FIG. 6 illustrates a prediction model evolution process incorporating aspects of the present invention.

FIG. 6 illustrates a prediction model evolution process 600 incorporating aspects of the present invention. As shown in FIG. 6, the provenance data in the MPP provenance database 120 serves as the basis of the prediction models 134. A workflow 510 is submitted during step 610. The workflow 510 is then optimized during step 620, based on data regarding past executions 125 (if any) from the MPP provenance database 120. The workflow 510 is then executed during step 630 and new provenance data is stored in the MPP provenance database 120 during step 640. Features 240 and 260 are extracted from the MPP provenance database 120 and storage area 550 during step 650. The prediction models are (re)calculated during step 660.

In this manner, the prediction functions $f_{qj}$ are the results of a computational method that learns from observed data using a statistical classification model, e.g., regression. As new workflows 510 are executed over time, more data is added to the provenance data in the MPP provenance database 120 and can be used to refine the prediction functions $f_{qj}$ and, consequently, the prediction models 134.

Global Optimization Based on Native Features

Users 105 might want to optimize a workflow 510 according to the use of a computing resource, such as execution time, number of compute nodes or memory usage. During the execution, data related to the use of computing resources are stored as native provenance features, which can be optimized based on global prediction models. For instance, consider that the goal of the user 105 can be to optimize execution time. By querying the MPP provenance database 120, the workflow optimizer and analysis system 100 knows how much time each program execution has taken to complete an activity in different situations. Prediction functions $f_{qj}$ that estimate the execution time of each program can be built, as described herein, mapping input features into expected execution times. The workflow optimizer and analysis system 100 explores several regression mechanisms to build such functions. A prediction model 134 for the overall execution time is built for each execution plan 136 using these prediction functions $f_{qj}$ and taking into account the partial order and the parallelism. Among the complete set of input features 240, some are not set by the user and the workflow optimizer and analysis system 100 explores such features to maximize the prediction models 134. The workflow optimizer and analysis system 100 chooses the execution plan that provides the best execution time after the optimization of the parameters.

Global Optimization Based on Custom Features

A different situation occurs when users 105 need to optimize the execution based on another metric that is not natively stored in the MPP provenance database 120. For example, assume that the users 105 are running several simulations and they want to evidence the situations of a simulation that correspond to higher risks. Although there are many simulation results in the MPP provenance database 120, there is no feature that directly reflects risk. However, the user 105 knows how to calculate the risk based on the results; querying, for instance, the values for pressure and tension in the resulting simulated model. Then, it is possible to define a customized function to extract a feature from the results. Using this customized feature, the workflow optimizer and analysis system 100 optimizes the prediction models 134 and selects the execution plan 136 that generates the situation with maximum predicted risk.

Global Optimization with Constraints

In another situation, the users 105 might still want to run the simulations that evidence the higher risks. However, the users 105 might want to keep the uncertainty level below a threshold T. Considering that the users have also provided the function to calculate the feature corresponding to the uncertainty level, the workflow optimizer and analysis system 100 maximizes the risk as long as the uncertainty level stays under T. In this situation, the workflow optimizer and analysis system 100 searches for the best execution plan 136 that satisfies the users' goals for higher risks while remaining under the uncertainty threshold. This example also applies if the users 105 have several constraints rather than a single one.

Dynamic Planning and Optimization of a Steered Workflow

Considering a workflow that is currently being executed, the users 105 check the partial results and see that the produced results are still not satisfactory. The users 105 decide then to steer the workflow 510 by changing a parameter that they had set for the initial execution. This change impacts in the execution plan 136 that the workflow optimizer and analysis system 100 had first chosen for the workflow 510. Consequently, several intermediate features of the workflow 510 observed during the execution deviate from the predicted values. This change may impact in the final outcome of the workflow 510 with respect to the users' goal(s). The workflow optimizer and analysis system 100 can use the observed intermediate features to update the prediction model 134 and re-optimize the execution making changes to the execution plan 136 accessing it on the in-memory database layer 520.

Thus, aspects of the invention create a novel approach for optimization based on provenance data, allowing the constant improvement of HPC workflows so that the best execution plan 136 for each scenario and user's needs can be chosen. The disclosed workflow optimizer and analysis system 100 discovers prediction functions $f_{qj}$ for a set of selected features 240 and 260, which are determined using provenance data, and maximizes the prediction functions $f_{qj}$ depending on users' goals and input data 109. Besides the prediction and optimization method, an additional aspect of the invention includes the architecture to support such an environment.

CONCLUSION

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
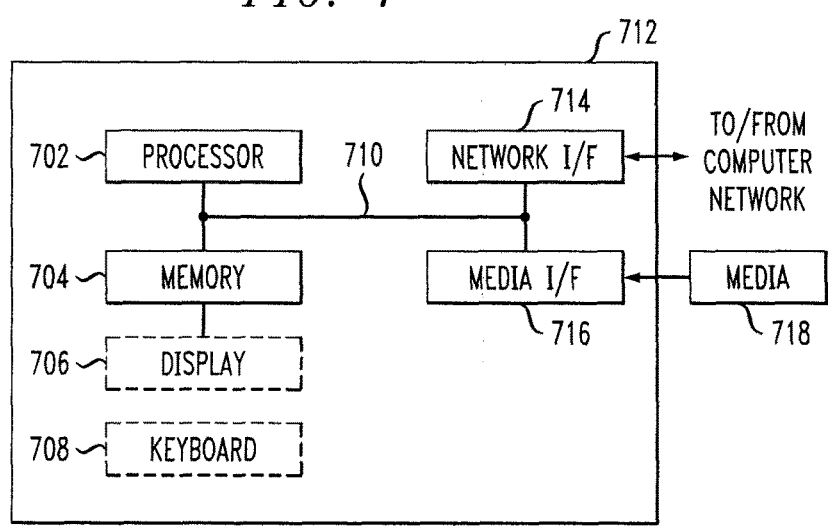
FIG. 7 is a system diagram of an exemplary computer system on which at least one embodiment of the invention can be implemented.

By way of example, an aspect of the present invention can make use of software running on a general purpose computer. FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved analytical processing of provenance data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for generating one or more prediction models for a workflow composed of a plurality of activities, comprising:

extracting one or more input features from input data from a plurality of previous executions of said plurality of activities and extracting one or more output features from output data from said plurality of previous executions of said plurality of activities, wherein said plurality of activities execute in one or more computing devices;

automatically learning, using at least one processing device, a plurality of prediction functions from one or more input features and one or more output features of said workflow, wherein each of said prediction functions predicts at least one of said output features of at least one of said plurality of activities of said workflow based on one or more of said input features of said at least one activity of said workflow;

selecting, using said at least one processing device, one of said plurality of prediction functions for each of said plurality of activities in said workflow based on a particular goal and a succession of said plurality of activities according to a definition of said workflow to generate a selected subset of prediction functions;

combining, using said at least one processing device, said selected subset of said plurality of prediction functions to generate said one or more prediction models based on the succession of said plurality of activities according to the definition of said workflow, wherein each of said one or more prediction models predicts a final output feature of said workflow based on one or more of said input features extracted from one or more initial inputs of said workflow; and selecting an instantiation of said workflow for a given input and said particular goal by evaluating a plurality of said one or more prediction models.

2. The method of claim 1, wherein said one or more input features and said one or more output features are extracted from one or more of input data, output data, execution data and provenance data of said workflow.

3. The method of claim 2, wherein said one or more input features and said one or more output features comprise features from within one or more files referenced by said provenance data.

4. The method of claim 1, wherein one or more of said input features and said output features are extracted using one or more file format cartridges.

5. The method of claim 1, wherein said plurality of activities of said workflow are specified by a user, and wherein said user further specifies one or more data dependencies between said plurality of activities and an association of one or more input features of at least one activity with one or more output features of at least one prior activity.

6. The method of claim 1, wherein each of said one or more prediction models predicts a final output feature of said workflow for a given execution plan of said workflow.

7. The method of claim 1, wherein said one or more output features of a given activity are propagated through said workflow as one or more input features of one or more activities following said given activity of said workflow.

8. The method of claim 1, wherein said instantiation of said workflow is selected by evaluating a prediction model representing said particular goal.

9. The method of claim 1, wherein said instantiation of said workflow is selected for said given input and said particular goal subject to one or more additional constraints.

10. The method of claim 1, wherein at least one parameter of one or more of a program and of one or more execution engines related to said workflow is unspecified, and wherein a value for said at least one unspecified parameter is selected to instantiate the workflow for said given input and said particular goal.

11. The method of claim 1, further comprising the step of repeating said steps of automatically learning a plurality of prediction functions and combining said plurality of prediction functions to regenerate said one or more prediction models based on new provenance data.

12. A computer program product comprising a non-transitory machine-readable storage medium having encoded therein executable code of one or more software programs, wherein the one or more software programs when executed perform the following steps:

extracting one or more input features from input data from a plurality of previous executions of said plurality of activities and extracting one or more output features from output data from said plurality of previous executions of said plurality of activities, wherein said plurality of activities execute in one or more computing devices;

automatically learning, using at least one processing device, a plurality of prediction functions from one or more input features and one or more output features of said workflow, wherein each of said prediction functions predicts at least one of said output features of at least one of said plurality of activities of said workflow based on one or more of said input features of said at least one activity of said workflow;

selecting, using said at least one processing device, one of said plurality of prediction functions for each of said plurality of activities in said workflow based on a particular goal and a succession of said plurality of activities according to a definition of said workflow to generate a selected subset of prediction functions;

combining, using said at least one processing device, said selected subset of said plurality of prediction functions to generate said one or more prediction models based on the succession of said plurality of activities according to the definition of said workflow, wherein each of said one or more prediction models predicts a final output feature of said workflow based on one or more of said input features extracted from one or more initial inputs of said workflow; and selecting an instantiation of said workflow for a given input and said particular goal by evaluating a plurality of said one or more prediction models.

13. A system for generating one or more prediction models for a workflow comprised of a plurality of activities, comprising:

a memory; and at least one hardware device, coupled to the memory, operative to implement the following steps:

extracting one or more input features from input data from a plurality of previous executions of said plurality of activities and extracting one or more output features from output data from said plurality of previous executions of said plurality of activities, wherein said plurality of activities execute in one or more computing devices;

automatically learning, using at least one processing device, a plurality of prediction functions from one or more input features and one or more output features of said workflow, wherein each of said prediction functions predicts at least one of said output features of at least one of said plurality of activities of said workflow based on one or more of said input features of said at least one activity of said workflow;

selecting, using said at least one processing device, one of said plurality of prediction functions for each of said plurality of activities in said workflow based on a particular goal and a succession of said plurality of activities according to a definition of said workflow to generate a selected subset of prediction functions;

combining, using said at least one processing device, said selected subset of said plurality of prediction functions to generate said one or more prediction models based on the succession of said plurality of activities according to the definition of said workflow, wherein each of said one or more prediction models predicts a final output feature of said workflow based on one or more of said input features extracted from one or more initial inputs of said workflow; and selecting an instantiation of said workflow for a given input and said particular goal by evaluating a plurality of said one or more prediction models.

14. The system of claim 13, wherein said workflow is executed substantially simultaneously with at least two of collection of provenance data of said workflow, generation of an execution plan for said workflow, generation of said one or more prediction models for said workflow, and said generation of said instantiation of said workflow for said given input and said particular goal.

15. The system of claim 14, wherein said workflow execution satisfies one or more performance criteria of said workflow.

16. The system of claim 13, wherein an execution plan of said workflow and run-time provenance data of said workflow are stored in an in-memory database during an execution of said workflow.

17. The system of claim 13, wherein data collected from previous executions of said workflow are stored in a storage system that can be accessed using one or more file format cartridges to extract one or more of said input features and said output features.

18. The system of claim 13, wherein said one or more input features and said one or more output features are extracted from one or more of input data, output data, execution data and provenance data of said workflow, and wherein said one or more extracted input features and said one or more extracted output features are stored in a massive parallel processing (MPP) database.

19. The system of claim 13, wherein said one or more input features and said one or more output features are extracted from one or more of input data, output data, execution data and provenance data of said workflow.

20. The system of claim 19, wherein said one or more input features and said one or more output features comprise features from within one or more files referenced by said provenance data.

21. The system of claim 13, wherein each of said one or more prediction models predicts a final output feature of said workflow for a given execution plan of said workflow.

22. The system of claim 13, wherein said one or more output features of a given activity are propagated through said workflow as one or more input features of one or more activities following said given activity of said workflow.

23. The system of claim 13, wherein at least one parameter of one or more of a program and of one or more execution engines related to said workflow is unspecified, and wherein a value for said at least one unspecified parameter is selected to instantiate the workflow for said given input and said particular goal.

* * * * *